S. H. Taylor,
Brick-Mold.
No. 109,778. Patented Nov. 29, 1870.

Witnesses: Inventor:
P. C. Dietench S. H. Taylor
Alex. H. Roberts per Munn & Co.
Attorneys.

UNITED STATES PATENT OFFICE.

SAMUEL H. TAYLOR, OF JACKSONVILLE, ILLINOIS, ASSIGNOR TO HIMSELF AND LE GRAND PARKER, OF SAME PLACE.

IMPROVEMENT IN BRICK-MOLDS.

Specification forming part of Letters Patent No. 109,778, dated November 29, 1870.

*To all whom it may concern:*

Be it known that I, SAMUEL H. TAYLOR, of Jacksonville, in the county of Morgan and State of Illinois, have invented a new and Improved Brick-Mold; and I do hereby declare that the following is a full, clear, and exact description thereof, which will enable others skilled in the art to make and use the same, reference being had to the accompanying drawing, forming part of this specification.

This invention relates to improvements in brick-molds; and it consists in a novel arrangement of the handles with the end pieces of the mold, which are hinged to the side pieces for opening to free the bricks when discharging, and the side pieces, which spring open when the ends are free, by which the handles are made to clamp the said sides and ends tight for receiving the clay, and to release them when the bricks are to be discharged, all as hereinafter described.

Figure 1:
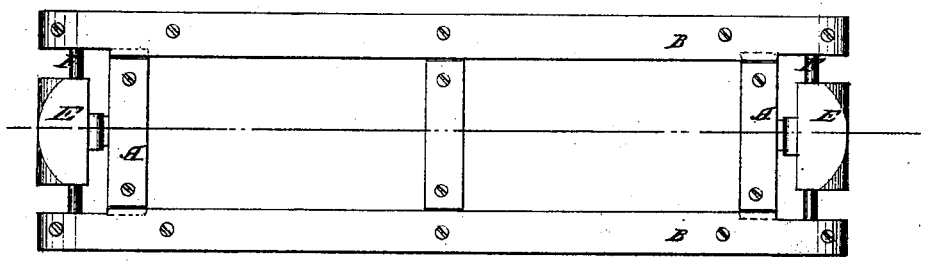
Figure 2:
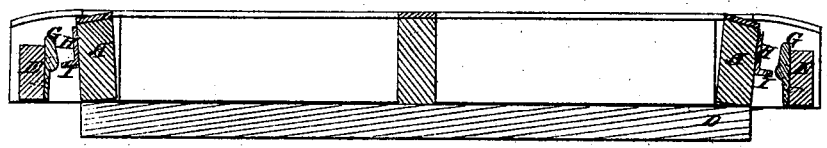
Figures 3, 4:
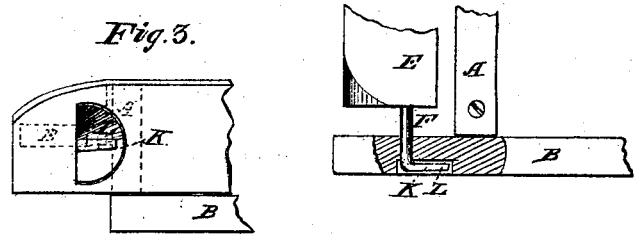

Figure 1 is a plan view of my improved mold-box. Fig. 2 is a longitudinal section of the same. Fig. 3 is a partial side elevation, and Fig. 4 is a horizontal section.

Similar letters of reference indicate corresponding parts.

The end pieces A of the mold are pivoted to the side pieces B near the bottom D, or to the bottom, so as to swing outward to release the pressed bricks when the mold is turned bottom up for discharging them; and the side pieces are also capable of springing outward, and for closing the said sides and ends, and holding them closed.

I arrange the pawls E on pivots, which are near the edge next the ends A of the mold, so that when the mold is right side up and held in the hand by the outside edges of the handles, the latter will turn on the pivots and cause the metal tappets G, placed on the inner edges, to bear against the plates H on the ends A and close the said ends, and the cranked pieces K on the axis of the handles will be forced down the inclines L on the side pieces and force them together. The flanges I prevent the handles from being turned too far.

By this arrangement, also, the handles will be turned to release the ends A and sides when the molds are turned bottom up, and held so that at the time it is required to discharge the bricks they will be released from the friction on the ends and sides, and escape more easily than if the said ends and sides are immovable.

Having thus described my invention, I claim as new and desire to secure by Letters Patent—

A brick-mold having hinged ends A A, combined, as described, with handles consisting of pawls E, tappets G, and plates H I, for the purpose of clamping the bricks and discharging them at the time and in the manner described.

SAMUEL H. TAYLOR.

Witnesses:
EDWD. DUNN,
JIM. D. STACY.